United States Patent
Yonnet et al.

(10) Patent No.: US 11,165,196 B2
(45) Date of Patent: Nov. 2, 2021

(54) CONNECTION DEVICE COMPRISING A MULTIPOLAR MAGNETIC CIRCUIT

(71) Applicants: Centre National de la Recherche Scientifique, Paris (FR); A. RAYMOND ET CIE, Grenoble (FR)

(72) Inventors: Jean-Paul Yonnet, Meylan (FR); Anthony Sanchez, Grenoble (FR)

(73) Assignees: A. RAYMOND ET CIE, Grenoble (FR); Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 16/652,366

(22) PCT Filed: Oct. 5, 2018

(86) PCT No.: PCT/FR2018/052465
§ 371 (c)(1),
(2) Date: Mar. 30, 2020

(87) PCT Pub. No.: WO2019/073150
PCT Pub. Date: Apr. 18, 2019

(65) Prior Publication Data
US 2020/0244005 A1    Jul. 30, 2020

(30) Foreign Application Priority Data

Oct. 10, 2017  (FR) ...................................... 1759460

(51) Int. Cl.
*H01R 13/44*       (2006.01)
*H01R 13/62*       (2006.01)
(Continued)

(52) U.S. Cl.
CPC ........... *H01R 13/6205* (2013.01); *B60D 1/64* (2013.01); *H01F 7/021* (2013.01); *H01R 13/625* (2013.01);
(Continued)

(58) Field of Classification Search
CPC ..... H01R 13/6205; H01R 13/631; B60D 1/64
(Continued)

(56) References Cited

U.S. PATENT DOCUMENTS 3,521,216 A * 7/1970 Tolegian ............ H01R 13/6205
                                                    439/39
3,810,258 A * 5/1974 Mathauser ......... H01R 13/6205
                                                    439/39
(Continued)

FOREIGN PATENT DOCUMENTS

CN      204558790       8/2015
EP      2760089 B1      11/2016
(Continued)

OTHER PUBLICATIONS

International Search Report for International Application No. PCT/FR2018/052465 dated Dec. 21, 2018, 3 pages.
(Continued)

*Primary Examiner* — Neil Abrams
(74) *Attorney, Agent, or Firm* — TraskBritt

(57) ABSTRACT

A connection device comprises a male element and a female element capable of being axially inserted one into the other and locking to one another by means of a bayonet mechanism. The male element and the female element each have a primary magnetic circuit comprising a ferromagnetic yoke and a plurality of magnets arranged in a plane transverse to the insertion axis. The magnetic circuits are capable of magnetically coupling to one another when the male element and the female element are in proximity and facing one another, in order to form a multipolar magnetic circuit in which the magnets are arranged between the two yokes in such a way as to generate a magnetic flux closing on the two yokes and generating an attractive axial magnetic force.

20 Claims, 7 Drawing Sheets

(51) Int. Cl.
*B60D 1/64* (2006.01)
*H01F 7/02* (2006.01)
*H01R 13/625* (2006.01)
*H01R 13/631* (2006.01)
*H01R 13/633* (2006.01)

(52) U.S. Cl.
CPC ......... *H01R 13/631* (2013.01); *H01R 13/633* (2013.01); *H01R 2201/26* (2013.01)

(58) Field of Classification Search
USPC .......................................................... 439/39
See application file for complete search history.

(56) References Cited

U.S. PATENT DOCUMENTS

| | | | | |
|---|---|---|---|---|
| 7,066,739 B2 * | 6/2006 | McLeish | ............ | H01R 13/6205 439/39 |
| 8,348,678 B2 * | 1/2013 | Hardisty | ............ | H01R 13/6205 439/39 |
| 8,608,502 B2 * | 12/2013 | Witter | ............ | F16B 1/00 439/335 |
| 9,300,081 B2 * | 3/2016 | Rudisill | ............ | H01R 13/6205 |
| 10,348,024 B2 * | 7/2019 | Yonnet | ............ | H01R 13/6205 |
| 2009/0239392 A1 * | 9/2009 | Sumitomo | ............ | H01R 13/64 439/39 |

FOREIGN PATENT DOCUMENTS

| | | | |
|---|---|---|---|
| FR | 2625847 | B1 | 5/1991 |
| FR | 3010243 | A1 | 3/2015 |
| FR | 3022084 | B1 | 12/2017 |

OTHER PUBLICATIONS

International Written Opinion for International Application No. PCT/2018/052465 dated Dec. 21, 2018, 6 pages.

* cited by examiner

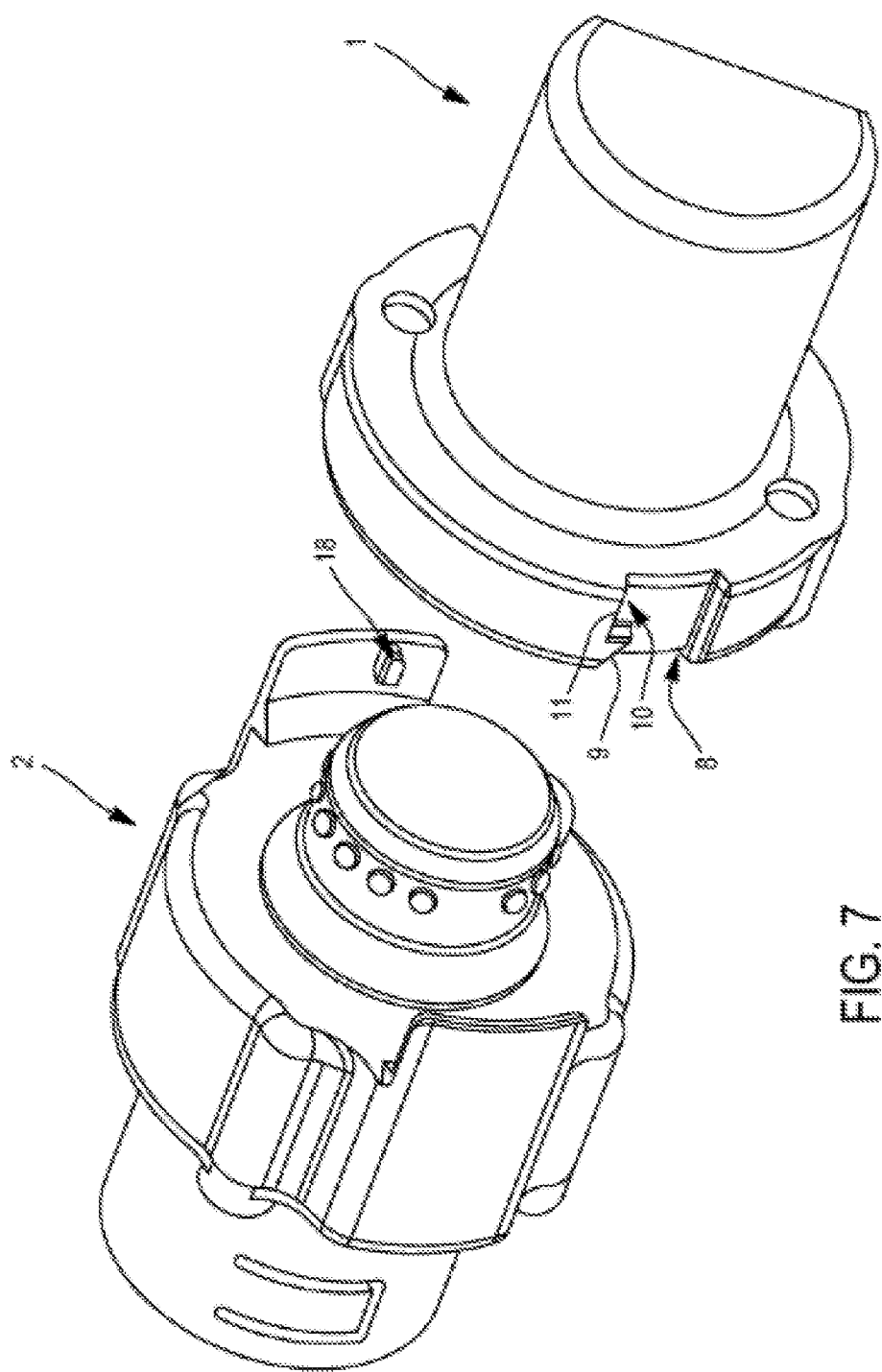

CONNECTION DEVICE COMPRISING A MULTIPOLAR MAGNETIC CIRCUIT

CROSS-REFERENCE TO RELATED APPLICATIONS

This application is a national phase entry under 35 U.S.C. § 371 of International Patent Application PCT/FR2018/052465, filed Oct. 5, 2018, designating the United States of America and published as International Patent Publication WO 2019/073150 A1 on Apr. 18, 2019, which claims the benefit under Article 8 of the Patent Cooperation Treaty to French Patent Application Ser. No. 1759460, filed Oct. 10, 2017.

TECHNICAL FIELD

The field of the present disclosure concerns connection devices comprising a female element and a male element capable of being axially inserted one into the other, with magnetic circuits being provided on the female element and the male element in order to create a magnetic field that tends to draw the two elements together when one element is inserted into the other.

More particularly, the disclosure concerns electrical connectors in which the female element can be a female electrical socket secured to a towing vehicle and the male element can be a male electrical plug of a trailer hitch.

BACKGROUND

It is known that a trailer hitch is hooked to the rear of a towing vehicle by a towbar secured to the body of the vehicle.

When the hitch of the trailer is hooked to the vehicle, the signal lights such as the vehicle's flashers, brake lights or backup lights are obscured by the trailer and these signal lights must be transferred from the towing vehicle to the trailer through an electrical connector comprising a female electrical socket generally secured to the towing vehicle and a male electrical plug connected by an electrical cable to the lights of the trailer.

French Patent No. FR3022084 discloses an example of such an electrical connector with a female electrical socket and a male electrical plug.

Magnets are arranged on the two electrical connectors to produce a mutual attraction effect that leads to their being automatically pressed against one another, and which contributes to facilitating the guiding of the male plug blindly into the female socket.

As specified in the aforementioned document, the axial attractive force exerted by the magnets on each other is relatively low. It is not always enough to hold the two connectors together in a secure manner. This is particularly due to the small size of the magnets that must be dimensioned so as to maintain a compact device. This is also required by the need to be able to disconnect the two connectors from each other without having to exert an excessive axial extraction force to counteract the magnetic attraction force, which would make the connecting device not very ergonomic.

For this reason, it is desirable to improve the connection of male and female electrical connectors and to improve the reliability of the locking of the connectors in the electrically connected position.

BRIEF SUMMARY

In order to achieve this purpose, the object of the present disclosure is provide a connection device comprising a male element and a female element capable of being inserted axially one into the other and of being locked together by means of a bayonet mechanism, the male element and the female element each bearing a primary magnetic circuit comprising a ferromagnetic yoke and a plurality of magnets disposed in a plane transverse to the axis of insertion. The primary magnetic devices are capable of being magnetically coupled together when the male element and the female element are in proximity facing one another to form a multipolar magnetic circuit in which the magnets are arranged between the two yokes in such a way as to generate a magnetic flux closing on the two yokes and generating an attractive axial magnetic force.

The ability to channel the fluxes generated by the magnets and to close the fluxes on the yokes makes it possible to develop a particularly intense magnetic force of attraction when the magnets are at a short distance between the male and female elements.

The intensity of this force is used to firmly press the male element against the female element as a supplement to the mechanical retention formed by the bayonet locking mechanism. In this way, a particularly reliable connection device is created.

According to other advantageous and non-limiting characteristics of the present disclosure, taken alone or in any technically feasible combination:

- the primary magnetic circuit of the female element and the primary magnetic circuit of the male element have a locking angular offset in a plane transverse to the axis of insertion in order to produce a retention magnetic torque having a spring effect,
- the locking angular offset is between 4° and 6°,
- the application of an unlocking torque on one or the other of the elements in order to place the two elements in unlocking position requires an unlocking angular offset between the primary magnetic circuit of the female element and the primary magnetic circuit of the male element for which the axial magnetic force of attraction has a lower intensity than the one generated when the two elements are arranged in locking position,
- the unlocking angular offset is between 10° and 45°,
- the multipolar magnetic circuit has four poles,
- the multipolar magnetic circuit has two poles,
- the female element comprises a retainer ring with an orifice in which a connection pad of the male element is inserted,
- the female element and the male element are provided with at least one guide cam tending to separate the male element from the female element for unlocking,
- the guide cam is formed by a tooth with inclined faces that is arranged on the female element and by a groove with inclined edges that is arranged on the male element, the tooth being configured to be engaged in the groove when the female element and the male element are inserted one into the other,
- the tooth is configured to be supported on the inclined edges of the groove so as to separate the male element from the female element for unlocking,
- the device comprises a mechanical foolproof system for angularly positioning the male element in the female element,
- the female element and the male element are electrical connectors, and/or
- the electrical connectors are electrical connectors for a trailer, and particularly a trailer hitch.

BRIEF DESCRIPTION OF THE DRAWINGS

Other characteristics and advantages of embodiments of the disclosure will be seen from the detailed description that follows, with reference to the accompanying figures in which:

FIGS. 1 and 7 are schematic illustrations of an electrical connector for a trailer hitch comprising a male electrical connector before the insertion thereof into the female electrical connector, pursuant to two variants according to the disclosure;

DETAILED DESCRIPTION

For the purpose of simplifying the following description, the same references are used for elements that are identical or that ensure the same function in the different described implementations of the product.

Figure 1:
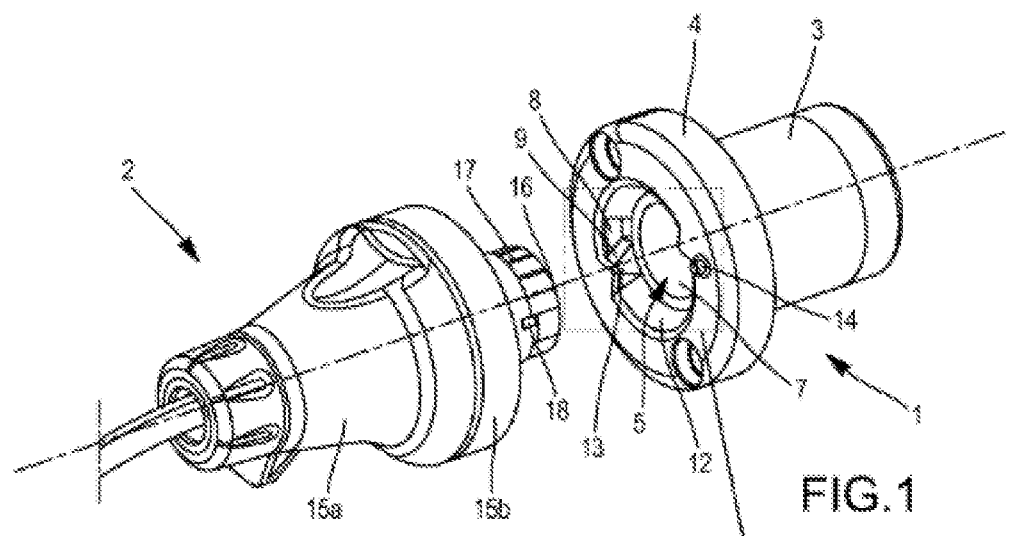
Figure 1A:
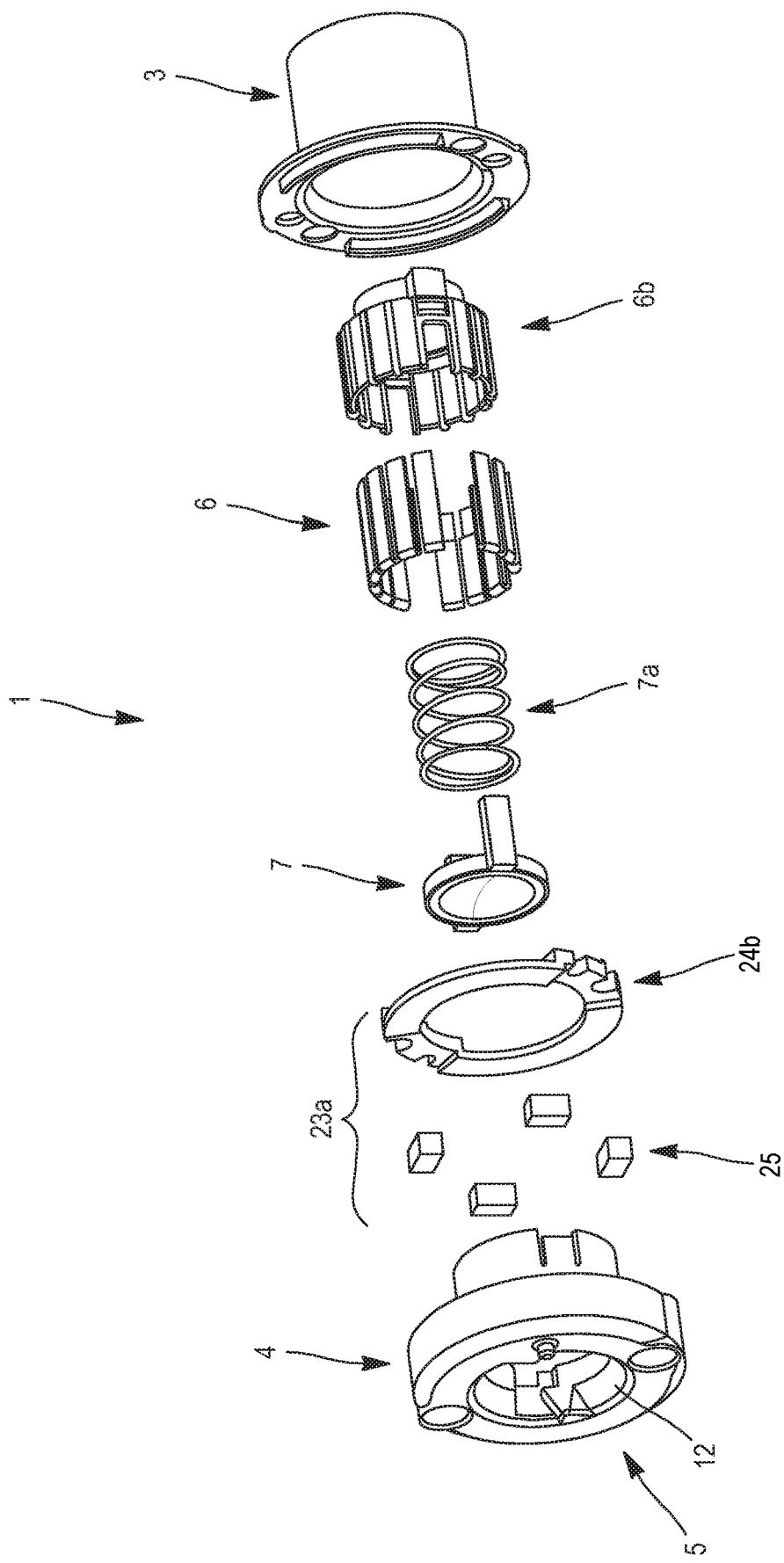
Figure 1B:
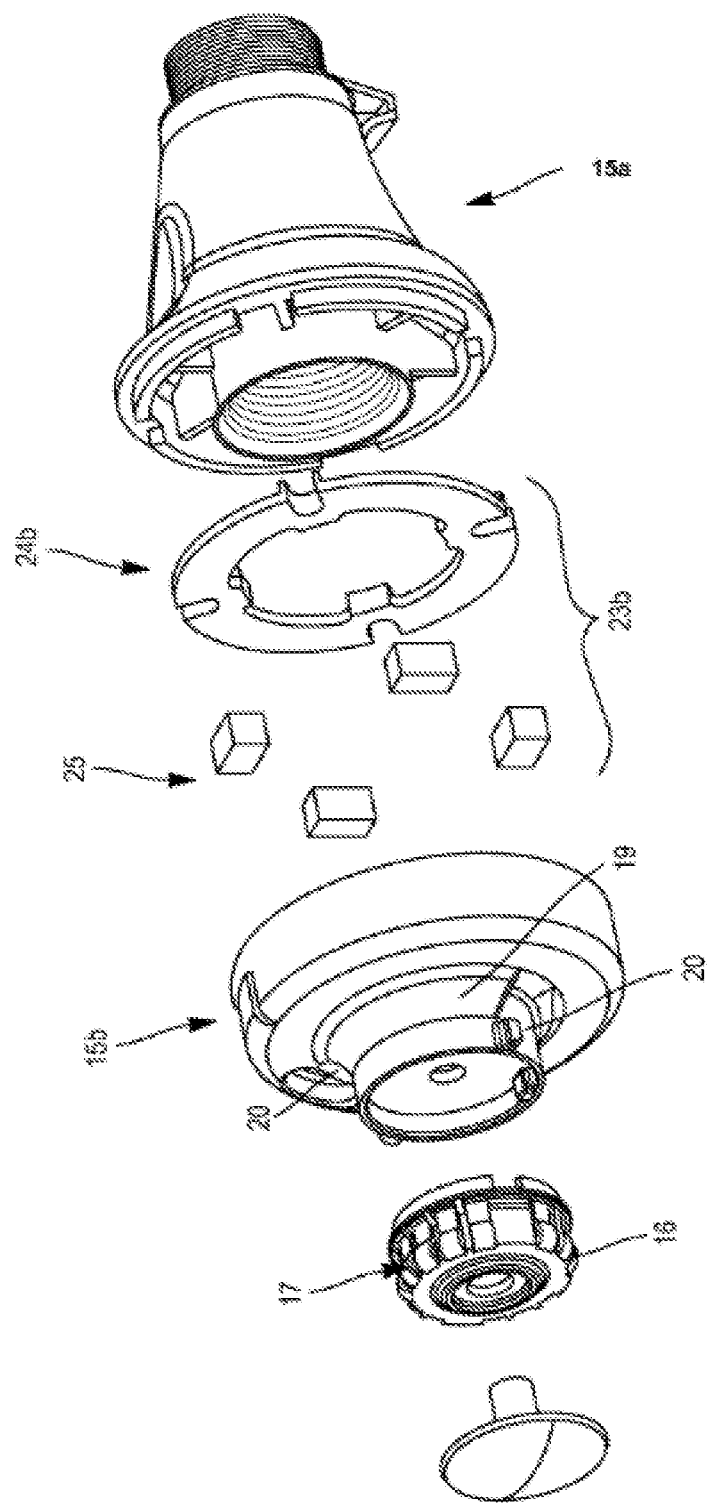

Schematically illustrated in FIGS. 1, 1a, 1b is an example of a connection device according to the disclosure, which here comprises a female element 1 and a male element 2 capable of being axially inserted one into the other along the axis A and of being locked in connection position, and vice versa.

The female element 1 here can be a female electrical socket intended, for example, to be secured to a body of a motorized towing vehicle (not shown), and the male element 2 here can be a male electrical plug that is connected by an electrical cable to the lights of a trailer (not shown).

As can be seen in FIGS. 1 and 1a, the female element 1 comprises a cylindrical cover 3 with a collar-shaped body defining a retainer ring 4 having an orifice 5 with a beveled peripheral edge 12.

In the particular case illustrated in FIGS. 1 and 1a where the connection device is an electrical connector, electrical blade contacts 6 can be arranged on the retainer ring 4 by means of a barrel 6b. Each electrical blade contact 6 can be wired by standard crimp terminal to an electrical cable.

A seal 7 mounted movably in axial translation, for example, by means of a return spring 7a, in the ring is provided here to close the orifice 5 in the absence of the male element 2, which prevents dust and other dirt from entering the retainer ring 4 of the female element 1.

Figure 2:
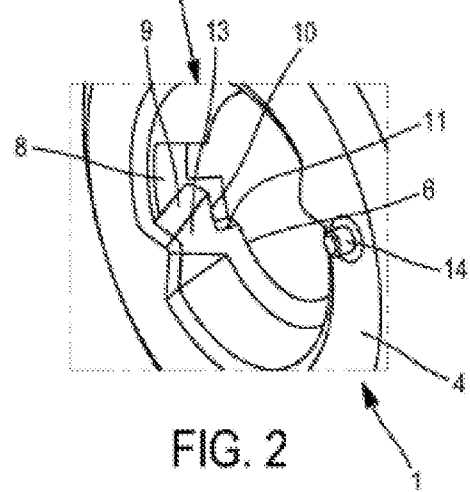
FIGS. 1a and 2 are a schematic illustration of the female electrical connector according to one embodiment of the disclosure.

As can be seen particularly in FIG. 2, the annular inner wall of the retainer ring 4 here has two diametrically opposite recesses 8. Each recess 8 forms an open axial slot on the edge of the orifice 5. The slot has a straight edge on one side and a sloped edge on the other side, which constitutes a guide ramp 9. The slope of the guide ramp 9 is large enough to allow a clean and neat connection of the male 2 and female 1 elements, and small enough so that the axial forces during the connection of the male 2 and female 1 elements are limited. Thus, an angular range of between 25° and 35° can be a good compromise.

The guide ramp 9 ends in an inner shoulder 10 limited by a stop 11. The length of the inner shoulder 10, i.e., the distance separating the end of the guide ramp 9 from the stop 11, is chosen to be large enough to correctly secure the connection between the male element 2 and female element 1, and small enough so that the two elements, female 1 and male 2, can be disengaged without excessive effort. A length of between 3 and 4 mm can be a good compromise.

With reference to FIGS. 1 and 1b, the male element 2 here comprises a cylindrical body 15a with a front collar 15b from which a cylindrical connection pad 16 extends axially. In the particular case in which the connection device is an electrical connector, electrical blade contacts 17 can be arranged on the annular outer surface of the connection pad 16. Each electrical blade contact 17 can be wired by standard crimp terminal to an electrical cable.

The front end of the connection pad 16 has a beveled peripheral edge to facilitate the insertion thereof into the orifice 5 of the female element 1. The base 19 of the connection pad 16 of the male element 2, on the side of the collar 15b, is frustoconical here with an outer surface complementary to the inner surface of the beveled peripheral edge 12 of the orifice 5 of the female element 1.

Figure 3:
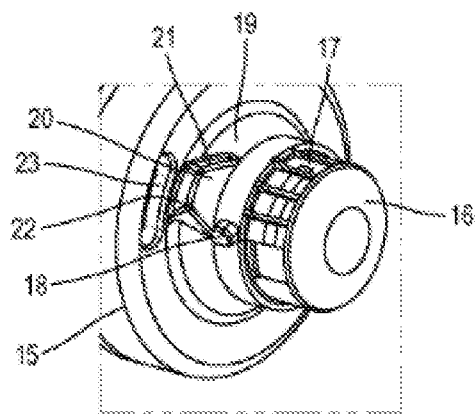
FIGS. 1b and 3 are a schematic illustration of the male electrical connector according to one embodiment of the disclosure.

Illustrated in FIGS. 1 and 3 are two radially projecting lugs on the annular outer surface of the connection pad 16. Lugs 18, which are diametrically opposite on the connection pad 16, are intended to penetrate into the axial slots forming the recesses 8 and to be lodged in the spaces defined by the inner shoulders 10. In this way, a bayonet locking mechanism of the male element 2 and the female element 1 is formed. Thanks to this mechanism, the male element 2 cannot be extracted from the female element 1 by a simple axial extraction force without, however, these elements being held pressed against one another.

During the insertion of the connection pad 16 into the orifice 5, the two lugs 18, therefore, engage in the slots forming the two recesses 8 by axial translation, and slide on the guide ramps 9. At the end of the insertion of the male element 2 into the female element 1, the two lugs 18 come into contact against the stops 11 of the recesses 8 while being guided by the inner shoulders 10. This configuration defines the locking position of the male element 2 and the female element 1.

In order to disconnect the two elements from one another, a rotational torque is applied to one or the other of the two elements 1, 2 so as to press the lugs 18 onto the straight edges of the slots forming the openings or recesses 8, the straight edges facing the stops 11 of the inner shoulders 10. This configuration defines the unlocking position of the male element 2 and of the female element 1. In this position, the lugs 18 are released from the inner shoulders 10, which can be extracted from the openings or recesses 8 by application of an axial extraction force on one of the elements 1, 2 in order to separate them from one another.

The connection device can advantageously provide a mechanical foolproof device to guide the insertion of the male element 2 into the female element 1 according to a specific angular position of the elements. To that end, an axially projecting pin 14 is provided on the front part of the collar of the body of the retainer ring 4 of the female element 1, and similarly an elongated hole 23 can be provided on the front part of the collar 15b of the male element 2 into which the pin 14 can be engaged.

FIG. 7 represents a connection device according to a variant of implementation of the disclosure. In the case represented in FIG. 7, the recesses 8 are formed on the outer contour of the collar 4 of the female connector 1. On each recess 8, there is the guide ramp 9, the inner shoulder 10, and the stop 11 of the inner shoulder 10. There is also the straight edge of the opening or recess 8 opposite to the stop 11 of the inner shoulder 10. The lugs 18 are borne by two elements axially projecting from the male element 2. As in the principal embodiment of FIGS. 1, 1a, 1b, the lugs 18 and the openings or recesses 8 form a bayonet locking mechanism.

According to the present disclosure and irrespective of the variant of embodiment selected, the female element 1 and the male element 2 each has a primary magnetic circuit 23a, 23b respectively arranged behind the front part of the collar 15b of the body of the male element 2 and behind the front part of the collar 4 of the female element 1, as shown in FIGS. 1a and 1b.

Each primary magnetic circuit 23a, 23b comprises an annular yoke 24a, 24b formed from a ferromagnetic material, such as soft iron. The annular yokes 24a, 24b are respectively arranged in the female element 1 and the male element 2 along a plane transverse to the axis of insertion. Each yoke 24a, 24b can take the form of a ring, as shown in FIGS. 1a and 1b, or take any closed form or be composed of a plurality of non-contiguous segments.

Each primary magnetic circuit also comprises a plurality of magnets 25 that are capable of generating a magnetic flux and are secured to the annular yoke 24a, 24b. The magnets 25 are arranged on the side of the front part of the collar 15b of the male element 2, and respectively on the side of the front part of the collar 4 of the female element 1, facing the annular yoke 24a, 24b. Consequently, when the male element 2 and the female element 1 are in proximity facing one another, the magnets 25 are disposed between the two yokes 24a, 24b.

As will be explained in more detail hereinafter, when the female and male elements 1, 2 are in proximity facing one another, the primary magnetic circuit 23a of the female element 1 and the primary magnetic circuit 23b of the male element 2 have an angular offset in a plane transverse to the axis of insertion. The offset shall be designated more simply hereinafter as "angular offset." The angular offset results from the angular orientation in which each of the primary magnetic circuits 23a, 23b has been made integral with the male element 2 and the female element 1. This also results in the relative angular orientation of the male element 2 and the female element 1 when they are at the point of being connected together.

The orientation of the magnets 25 is chosen such that, at least in a range of angular offsets, a magnetic force of attraction is developed resulting in the drawing of the two elements 1, 2 together. Several preferred examples will be detailed hereinafter, in relation to the description of FIGS. 5a and 5b.

In the embodiment represented in FIGS. 1a and 1b, four permanent magnets are respectively arranged and regularly distributed at the periphery of each of the annular yokes 24a, 24b at 90° from one another. Of course, another distribution could be considered, for example, separating two adjacent magnets 25 by an angle of between 60° and 120°. This distribution is not necessarily identical on both primary magnetic circuits 23a, 23b, although for simplicity of implementation of the magnetic phenomena that are at work, such configuration is preferred. In particular, this makes it possible to establish an angular position of reference for which the magnets 25 of each primary magnetic circuit 23a, 23b are facing one another.

The permanent magnets can take the form of a cube of a few millimeters on a side, and can be composed of NdFeB. They can have a residual flux on the order of 1.2 T or more.

Figure 5A:
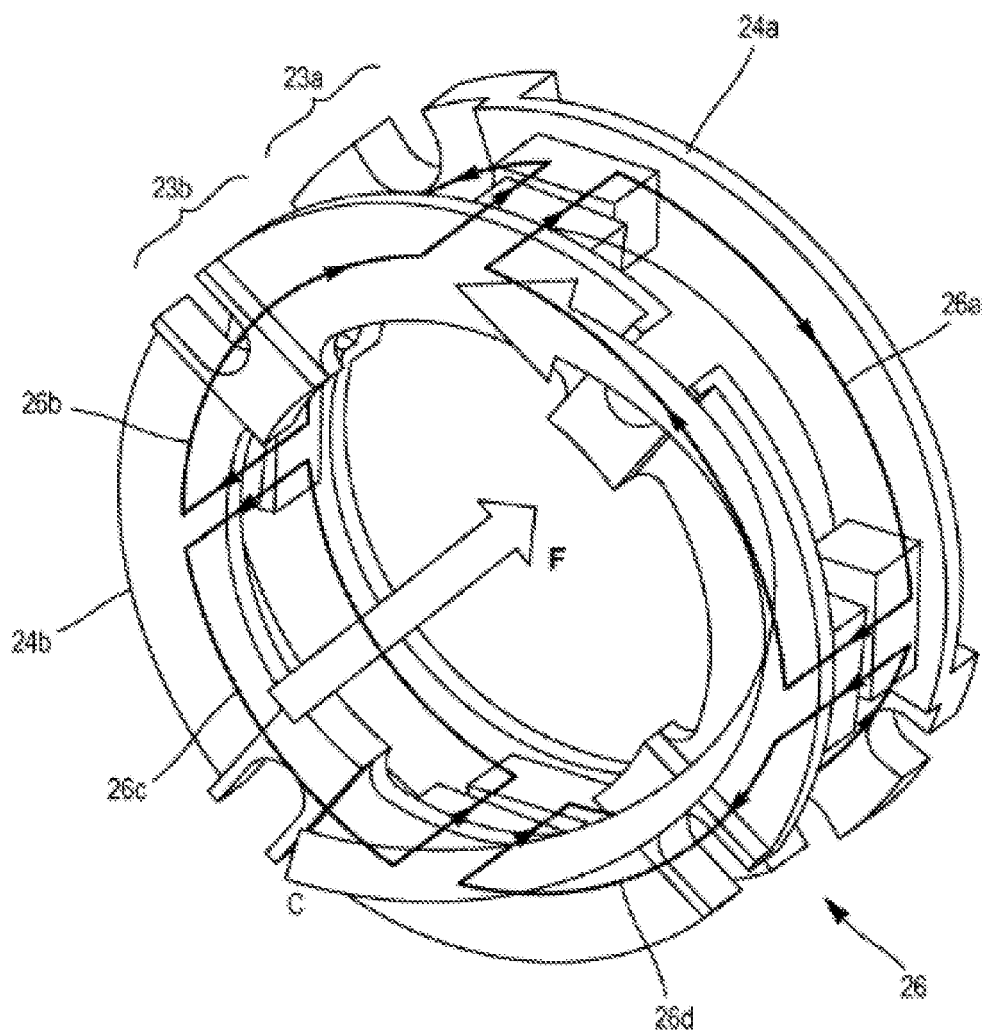
FIGS. 5a and 5b illustrate two examples of multipolar magnetic circuits that can be employed in a connection device according to the disclosure.

Represented in FIG. 5a are the two primary magnetic circuits 23a, 23b, isolated from the remainder of the parts comprising the male element 2 and female element 1 for better visibility, when these elements are brought together facing one another in the insertion position. In the configuration of magnets 25 shown in FIG. 5a, every adjacent pair of magnets of one of the primary magnetic circuits 23a, 23b is composed of magnets oriented in order to present opposite polarities, according to a "NSNS" type configuration. In this configuration, there are two angular offsets for which the magnets of each primary magnetic circuit 23a, 23b are facing each other, opposing faces of opposite polarities, which are, therefore, mutually attractive.

In the arrangement shown in FIG. 5a, the primary magnetic circuits 23a, 23b tend to couple together magnetically to form a multipolar magnetic circuit 26. The circuit produces an axial force of attraction that tends to bring together or separate the two elements 1, 2 from each other and a magnetic torque that tends to cause one of the elements 1, 2 to turn relative to the other. The force and the torque are represented by the arrows F and C in FIG. 5a. The magnetic fluxes generated by the permanent magnets 25 are channeled, circulate and close on the annular yokes 24a, 24b.

In this way, four magnetic flux loops are formed, circulating in each of the adjacent pairs of magnets of each primary magnetic circuit 23a, 23b and in each portion of annular yoke 24a, 24b separating the pair of magnets 25. The multipolar magnetic circuit 26 then has four poles 26a, 26b, 26c, 26d as is shown schematically in FIG. 5.

The ability to channel the fluxes generated by the permanent magnets 25 and of closing them to constitute magnetic poles makes it possible to develop a particularly intense force of attraction between the male element 2 and female element 1, considerably more intense than what would be generated by primary magnetic circuits 23a, 23b simply composed of magnets of the same dimension as those employed here.

The intensity of this force is employed in the present disclosure to guide the connection of the male element 2 to the female element 1 and to firmly press the male element 2 against the female element 1 as a supplement to the mechanical retention formed by the bayonet locking mechanism. In this way, a particularly reliable connection device is created. Thus, the magnetic force of attraction of the two elements 1, 2 on each other naturally promotes the penetration of the lugs 18 into the slots or recesses 8, and the sliding of the lugs 18 on the guide ramps 9 to position the lugs 18 in the inner shoulder 10.

In order to allow the disconnection of the device using reduced axial extraction force, and less than the force exerted by the magnetic attraction force, the male element 2 and female element 1 can be provided with at least one guide cam tending to separate the two male and female elements 2, 1 from one another when the elements are moved in rotation relative to the other from the locking position to the unlocking position.

Thus, and as shown in FIGS. 1, 2 and 3, the peripheral edge 12 of the orifice 5 can be provided with two diametrically opposite teeth 13, each having two inclined surfaces that serve as support surfaces. The frustoconical base 19 of the male element 2 can include two grooves 20 with inclined edges 21, 22 in which the teeth 13 with inclined surfaces of the female element 1 can be engaged respectively when the male element 2 is inserted into the female element 1.

The separation caused by the rotation of the two elements relative to one another results in reducing the axial magnetic attraction and, therefore, facilitates the disconnection of the two male and female elements. In other words, it is understood that during the change from a locking position to an unlocking position, the breaking of the magnetic bond is facilitated by the mechanical cooperation between the inclined edges 21, 22 of the grooves 20 of the pad 16 of the male element 2 and the inclined surfaces of the teeth 13 of the female element 1, forming the guide cams.

In general, the direction and intensity of the force and of the magnetic torque that are generated by the multipolar magnetic circuit 26 depend on the angular offset existing between the two primary magnetic circuits 23a, 23b. Thus, FIG. 6 respectively represents the component along the axis A of insertion of the magnetic force, and the magnetic torque generated by the multipolar magnetic circuit 26 based on the angular offset. Conventionally, the offset for which the multipolar magnetic circuit 26 produces a maximum force of attraction between the two primary magnetic circuits 23a, 23b and a null magnetic torque is defined as the null or reference angular offset. The primary magnetic circuits 23a, 23b are respectively secured to the male element 2 and female element 1 so that a null angular offset results in the lugs 18 being positioned approximately facing the openings or recesses 8.

Figure 6:
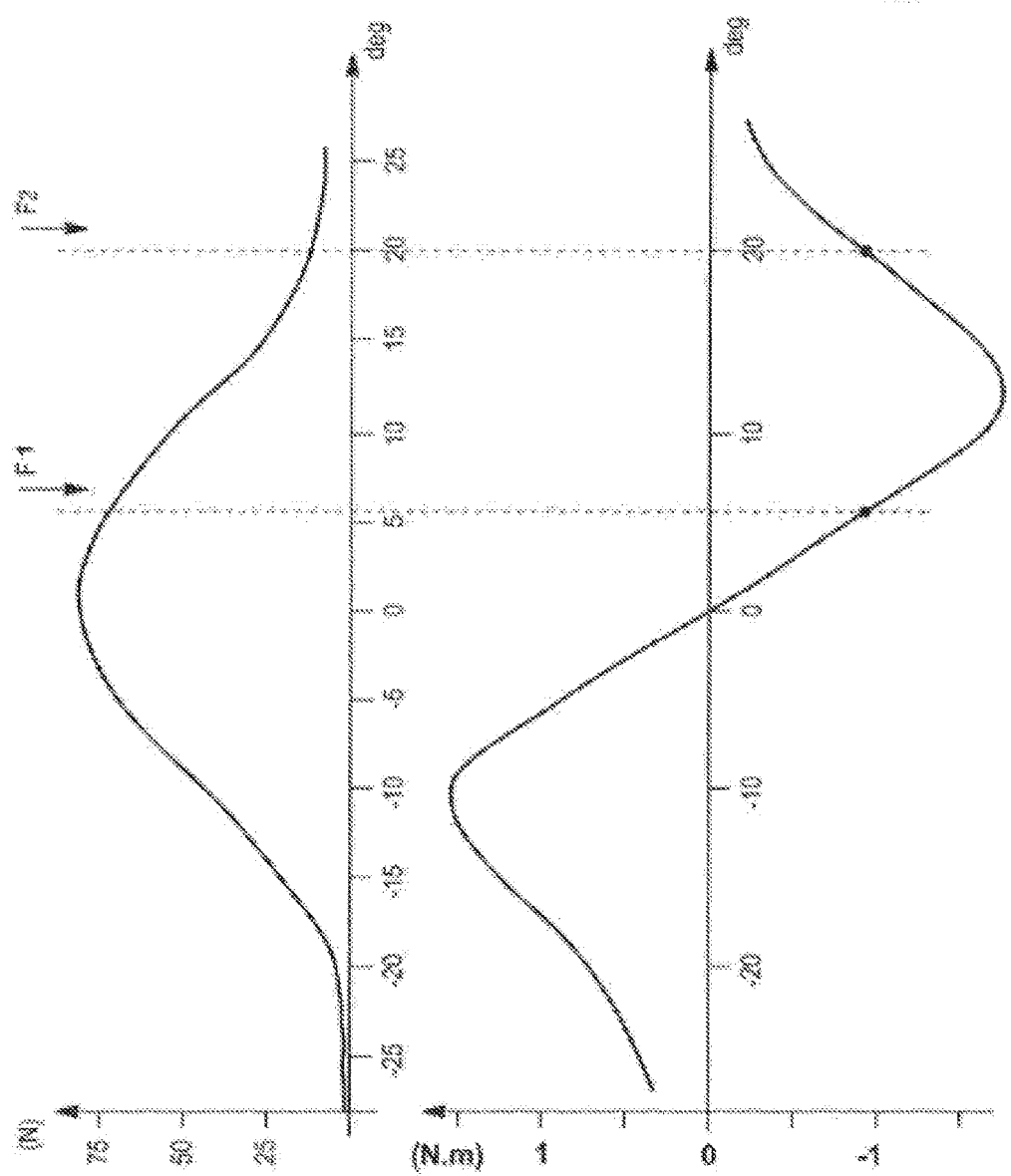
FIG. 6 represents the development of the force and magnetic torque generated by the multipolar magnetic circuits of FIGS. 5a and 5b as a function of the angular offset.

It can be verified in FIG. 6 that around the null angular offset, the multipolar magnetic circuit 26 produces a force of attraction of strong intensity tending to press the male element 2 against the female element 1. The magnetic torque tends to return the angular offset toward a balanced null angular offset, which guides the movement of the lugs 18 toward the slots forming the openings or recesses 8. The multipolar magnetic circuit 26, therefore, allows the natural guidance, blindly, of the insertion of the male element 2 into the female element 1, while angularly orienting the elements relative to one another to enable placing in a locked position without a user having to exert effort or particular torque on the elements 1, 2. It will be noted that according to the configuration of the multipolar magnetic circuit 26, the circuit has a plurality of angular offsets meeting the definition of reference angular offset mentioned above. In this case, it is sufficient to choose, as the angular offset reference value, the one that approximately places the lugs 18 facing the recesses 8. This choice can be materialized by the presence of a mechanical foolproof mechanism as previously described.

Figure 4A:
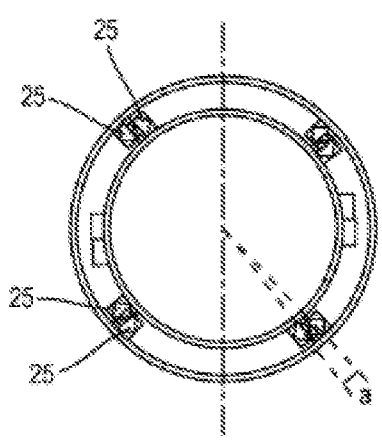
FIGS. 4a and 4b illustrate the angular offset of the primary magnetic circuits arranged on the female electrical connector and the male electrical connector when they are in a locked and unlocked position.

In one very advantageous variant of the disclosure, in the locking position illustrated in FIG. 4a and as indicated by the arrow F1 in FIG. 6, the primary magnetic circuits 23a, 23b have a non-null angular offset "a" between them of several degrees, for example, between 4° and 6°, so as to exert a residual magnetic torque resulting in holding the lugs 18 against the stops 11. A return spring effect is thus produced, allowing the lugs 18 to be held against the stops 11. The locking position of the two elements 1, 2 is secured by means of the holding torque.

Figure 4B:
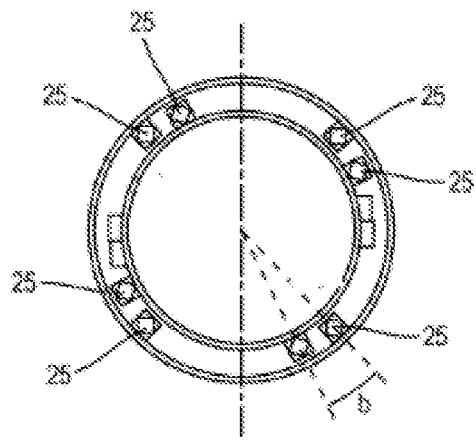

As was previously seen, to unlock the connection device, an unlocking torque is applied to one or the other of the elements 1, 2 to position them in an unlocking position in which the lugs 18 are butted against the straight walls of the slots or recesses 8. The unlocking position leads to imposing an unlocking angular offset b, represented in FIG. 4b, between the two primary magnetic circuits 23a, 23b. This position is indicated by the arrow F2 in FIG. 6. Advantageously, the angular offset is chosen in such a way that the axial magnetic pulling force has a relatively low intensity, as can clearly be seen in FIG. 6, enabling the male element 2 to be extracted from the female element 1 with a relatively low force of extraction by the user.

More generally, it is desirable that in the unlocking position, the magnetic pulling force produced by the multipolar magnetic circuit 26 is less than (and preferably significantly less than) the magnetic pulling force produced by the multipolar magnetic circuit 26 in the locking position. In order to obtain this particular configuration, one can experiment with the mechanical dimensioning of the female and male elements 1, 2, and especially with the angular offset of the lugs 18 in the recesses 8 between the two locking and unlocking positions, and with the configuration of the primary magnetic circuits 23a, 23b so as to adjust the profile of the characteristic curves, such as those shown in FIG. 6.

This ingenious characteristic will also be able to be used alone or in combination with the guide cam, in order to seek to reduce the extraction force to be applied to achieve the disconnection of the device.

It will be noted in FIG. 6 that, in the unlocking position, a return torque is always applied, so that if the user relaxes his extraction efforts, the two elements, female 1 and male 2, can be assembled again.

In the configuration of the multipolar magnetic circuit 26 of FIG. 5a, there are four poles and, therefore, two angular positions of reference. In this case, and as already mentioned, the mechanical foolproof system can enable assembly to be allowed only for one of the reference positions.

Preferably, however, it will be decided to form a multipolar magnetic circuit 26 comprising only two poles and, therefore, having only a single reference angular offset. This can be achieved by arranging only two magnets 25 on the annular yokes 24a, 24b of each primary magnetic circuit 23a, 23b. However, such a configuration does not make it possible to easily obtain the force and torque profiles that are shown in FIG. 6, although such a configuration remains possible in some applications.

Preferably, therefore, four permanent magnets will be used on each annular yoke 24a, 24b, in an arrangement similar to the one described in relation to the description of FIG. 5a. However, in this preferred mode and for each primary magnetic circuit 23a, 23b, two adjacent pairs of magnets are oriented in order to present opposite polarities, and two other adjacent pairs of magnets are oriented in order to present identical polarities, in order to form an "NNSS" configuration. In this way, two magnetic circulation loops 26a, 26b of opposite polarity are formed.

Figure 5B:
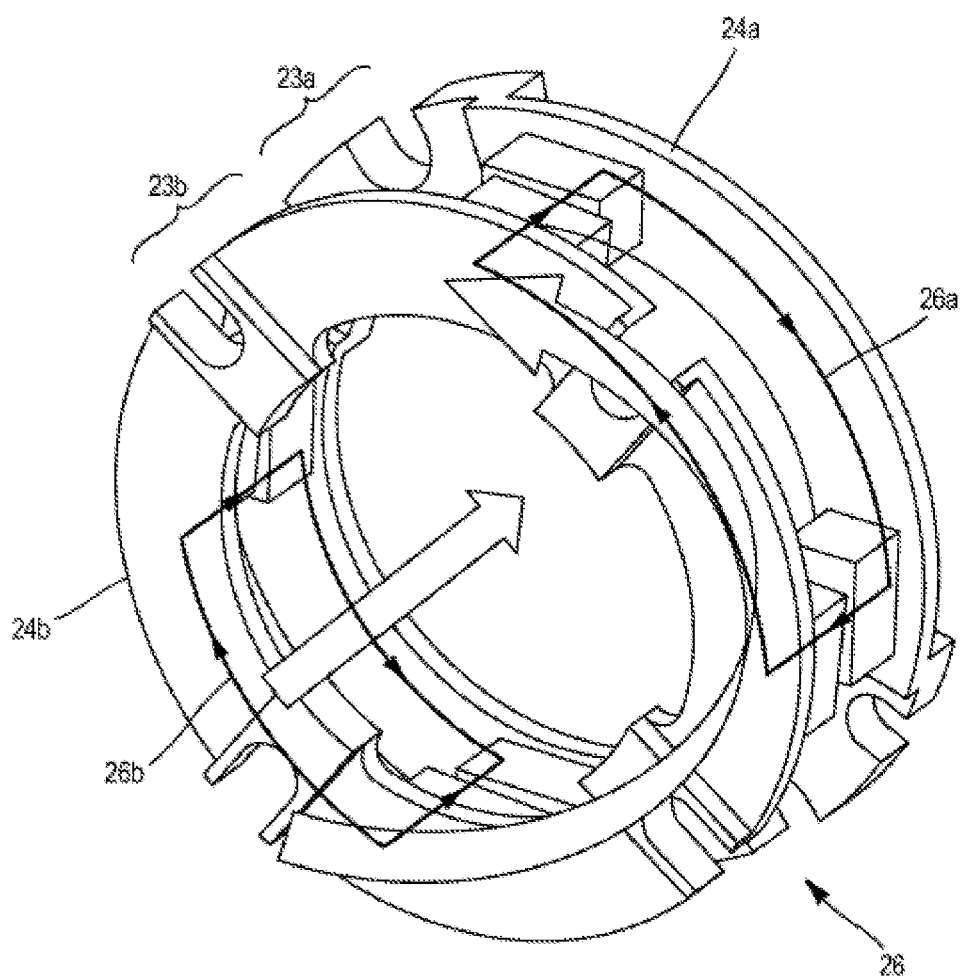

As can clearly be seen in FIG. 5b, it is not necessary in this case for the yokes to have a closed form, such as a ring shape, to make it possible to close the fluxes and form the two poles. Two disjunct sections of a ferroelectric material are sufficient to form a functional yoke. In this configuration, the magnetic behavior of the multipolar magnetic circuit 26 is very similar to the one represented by the characteristic curves of FIG. 6.

It could be decided to combine such a configuration of the multipolar magnetic circuit 26 in dipole with a foolproof mechanical device, even if such device is no longer necessary.

Of course, the disclosure is not limited to the embodiments described, and variants of embodiments can be made without going beyond the scope of the invention as defined by the claims.

Although in the illustrated examples four magnets per set of magnets of each primary magnetic circuit 23*a*, 23*b* are indicated, the disclosure can be applied to a different number of magnets, preferably an even number of magnets. Moreover, some of the magnets 25 can be replaced by simple ferromagnetic parts, as long as such replacements always enable the fluxes to be closed in the multipolar magnetic circuit. It is, therefore, not necessary for all the magnets 25 to be composed of permanent magnets.

It will be noted that the mechanical foolproof system could be arranged in such a way that the pin 14 is placed on the collar of the body 15 of the male element 2 and the elongated hole 23 on the collar of the body of the retainer ring 4 of the female element 1.

It will also be noted that when the connection device is an electrical connector, the electrical blade contacts 6, 17 are distributed internally for the female electrical socket 1 and externally for the male electrical plug 2 and they extend in the axial direction of insertion. Good contact of the electrical blade contacts 6 and 17 is guaranteed by the choice of using spring blade connectors.

The invention claimed is:

1. A connection device, comprising: a male element and a female element capable of being inserted axially one into the other and of being locked together by means of a bayonet mechanism, the male element and the female element each having a respective primary magnetic circuit each primary magnetic circuit comprising a ferromagnetic yoke and a plurality of magnets disposed in a plane transverse to the axis of insertion, the primary magnetic circuits being capable of being magnetically coupled together when the male element and the female element are in proximity facing one another to form a multipolar magnetic circuit in which the magnets are arranged between two ferromagnetic yokes in such a way as to generate a magnetic flux closing on the two ferromagnetic yokes and generating an attractive axial magnetic force.

2. The connection device of claim 1, wherein, in a locking position, the primary magnetic circuit of the female element and the primary magnetic circuit of the male element have a locking angular offset in a plane transverse to the axis of insertion so as to produce a retention magnetic torque having a spring effect.

3. The connection device of claim 2, wherein the locking angular offset is between 4° and 6°.

4. The connection device, of claim 3, wherein application of an unlocking torque on one or the other of the male and female elements in order to place the male and female elements in an unlocking position requires an unlocking angular offset between the primary magnetic circuit of the female element and the primary magnetic circuit of the male element for which an axial magnetic force of attraction has a lower intensity than the one generated when the male and female elements are arranged in the locking position.

5. The connection device of claim 4, wherein the unlocking angular offset is between 10° and 45°.

6. The connection device of claim 5, wherein the multipolar magnetic circuit has four poles.

7. The connection device of claim 5, wherein the multipolar magnetic circuit has two poles.

8. The connection device of claim 5, wherein the female element comprises a retainer ring with an orifice in which a connection pad of the male element is inserted.

9. The connection device according to of claim 5, wherein the female element and the male element are provided with at least one guide cam tending to separate the male element from the female element when unlocking.

10. The connection device of claim 9, wherein the guide cam is formed by a tooth with inclined faces that is arranged on the female element and by a groove with inclined edges that is arranged on the male element, the tooth being configured to be engaged in the groove when the female element and the male element are inserted one into the other.

11. The connection device of claim 10, wherein the tooth is configured to be supported on the inclined edges of the groove so as to separate the male element from the female element (1) when unlocking.

12. The connection device of claim 5, further comprising a mechanical foolproof system for angularly positioning the male element in the female element.

13. The connection device of claim 5, wherein the female element and the male element are electrical connectors.

14. The connection device of claim 13, wherein the electrical connectors are electrical connectors for a trailer hitch.

15. The connection device of claim 2, wherein application of an unlocking torque on one or the other of the male and female elements in order to place the male and female elements in an unlocking position requires an unlocking angular offset between the primary magnetic circuit of the female element and the primary magnetic circuit of the male element for which an axial magnetic force of attraction has a lower intensity than the one generated when the male and female elements are arranged in the locking position.

16. The connection device of claim 1, wherein the multipolar magnetic circuit has two or four poles.

17. The connection device 1, wherein the female element comprises a retainer ring with an orifice in which a connection pad of the male element is inserted.

18. The connection device according to of claim 1, wherein the female element and the male element are provided with at least one guide cam tending to separate the male element from the female element when unlocking.

19. The connection device of claim 1, wherein the guide cam is formed by a tooth with inclined faces that is arranged on the female element and by a groove with inclined edges that is arranged on the male element, the tooth being configured to be engaged in the groove when the female element and the male element are inserted one into the other.

20. The connection device of claim 1, wherein the female element and the male element are electrical connectors.

* * * * *

UNITED STATES PATENT AND TRADEMARK OFFICE
CERTIFICATE OF CORRECTION

PATENT NO. : 11,165,196 B2
APPLICATION NO. : 16/652366
DATED : November 2, 2021
INVENTOR(S) : Jean-Paul Yonnet and Anthony Sanchez Page 1 of 1

It is certified that error appears in the above-identified patent and that said Letters Patent is hereby corrected as shown below:

In the Specification

Column 7, Line 53, change "Fl" to --F1--

In the Claims

Claim 1, Column 9, Line 27, change "circuit each" to --circuit, each--
Claim 4, Column 9, Line 46, change "device, of" to --device of--
Claim 11, Column 10, Line 21, change "element (1) when" to --element when--

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*